(12) United States Patent
Priotti

(10) Patent No.: US 7,298,787 B2
(45) Date of Patent: Nov. 20, 2007

(54) SYSTEM, AND ASSOCIATED METHOD, FOR FACILITATING BROADBAND MULTI-CARRIER TRANSMISSION

(75) Inventor: Paolo Priotti, Yokohama (JP)

(73) Assignee: Nokia Corporation, Espoo (FI)

( * ) Notice: Subject to any disclaimer, the term of this patent is extended or adjusted under 35 U.S.C. 154(b) by 686 days.

(21) Appl. No.: 10/877,787

(22) Filed: Jun. 25, 2004

(65) Prior Publication Data
US 2005/0286611 A1    Dec. 29, 2005

(51) Int. Cl.
    *H04B 7/02*    (2006.01)
(52) U.S. Cl. .................. 375/267; 375/144; 375/260; 375/259; 375/285
(58) Field of Classification Search ................ 375/267, 375/260, 285, 259, 144, 347
    See application file for complete search history.

(56) References Cited

U.S. PATENT DOCUMENTS

2002/0118724 A1* 8/2002 Kishimoto et al. ......... 375/132
2003/0002471 A1* 1/2003 Crawford et al. ........... 370/343
2003/0235238 A1* 12/2003 Scheim et al. .............. 375/148

\* cited by examiner

*Primary Examiner*—Mohammed Ghayour
*Assistant Examiner*—Sonia J King
(74) *Attorney, Agent, or Firm*—Banner & Witcoff, Ltd.

(57) ABSTRACT

A method for facilitating broadband multi-carrier wireless transmission, whereby a plurality of transmit antennas are divided into two or more transmit antenna groups of transmit antennas so that the correlation between antennas in each group is minimized, and each group of antennas transmits on a predetermined frequency with a different time periodicity, and each transmit antenna in each group transmits training sequences which are reciprocally time-orthogonal. Each of a plurality of receive antennas receives signals from each transmit antenna group. The signals from each group are separated via a band-pass filter, and a maximum estimation range of a frequency offset estimation algorithm is determined by the group having the shortest time period, and the accuracy of the frequency offset estimation algorithm is determined by the group having the longest time period. The received signal is corrected with the frequency offset.

23 Claims, 6 Drawing Sheets

SYSTEM, AND ASSOCIATED METHOD, FOR FACILITATING BROADBAND MULTI-CARRIER TRANSMISSION

TECHNICAL FIELD

The invention is related to the field of wireless transmission in general and, more specifically, to broadband multi-carrier wireless transmission links. Still more specifically, the invention is related to a system and associated method for utilizing a frequency offset estimation algorithm and training sequence having improved accuracy for MIMO and SISO broadband multicarrier wireless transmission links.

BACKGROUND

In multicarrier wireless transmission, a difference in the carrier frequency between a transmitter and a receiver causes overlapping of different subcarriers and, as such, interference, and performance degradation. In systems such as Orthogonal Frequency Division Multiplexing (OFDM), this may result in a loss of orthogonality between subcarriers. It is thus necessary to precisely estimate at the receiver the carrier frequency offset and correct it in the receiver itself (or via feedback at the transmitter). The correction can be made acting directly on the control signal of a voltage-controlled oscillator (VCO) or alternatively by signal processing. Frequency offset correction is usually followed by a phase tracking process, to compensate residual constellation rotation. Frequency offset estimation may be data-aided (e.g., based on a training sequence or on pilot tones) or non data-aided (e.g., based on the statistical properties of the data signal).

Conventional frequency offset estimation algorithms that achieve the foregoing are often based on the phase of the auto-correlation of the received signal. Such algorithms require a time periodicity in the signal. In practice, the periodicity may be designed in the training sequence, or the periodicity may be naturally present between cyclic prefix (CP) and the data portion of an OFDM signal. The phase of the auto-correlation is linearly proportional to the offset, and the maximum offset estimation range is inversely proportional to the time period of the received signal. This limits the maximum estimation range for algorithms based on the CP to half the inter-carrier spacing.

For a number of reasons, it is preferable to use a training sequence rather than CP. For example, the precision of frequency offset estimation depends on the number of samples used to compute the auto-correlation. With a single CP the number of samples does not guarantee a good estimation performance for a low signal-to-noise ratio (SNR), especially if the number of subcarriers is less than 100. So if the CP is used, it is necessary to take an average over several CPs. In packet-based systems, however, there is typically little time available for synchronization processing; thus, an a-priori known training sequence proves to be more efficient and better performing. Another reason why it is preferable to use a training sequence rather than CP, particularly germane in systems with a carrier frequency of several GHz and relatively narrow inter-carrier spacing, the use of commercial oscillators with a long-term accuracy of around 20 parts per million (PPM) results in a maximum offset that is well above the half inter-carrier spacing. It is thus necessary to make available a signal with a time period shorter than the distance from the CP to the tail of a data block.

In a packet-based, broadband multi-carrier system, where a training sequence is adopted, several frequency offset estimation algorithms have been developed, but, in systems wherein the training sequence should be as short as possible, no such systems allow a wide offset estimation range to be combined with high estimation accuracy. Moreover, no such systems guarantee high estimation accuracy for low SNR or SIR, especially in multipath fading channel condition. Finally, it should be noted that in such systems, the estimation of a frequency offset performed with a MIMO antenna system has been utilized to improve the robustness against multipath fading, but has not been fully utilized yet to improve offset estimation accuracy.

Accordingly, a continuing search has been directed to the development of an approach which improves frequency offset estimation accuracy without reducing the estimation range. Such frequency offset estimation would preferably be performed using algorithms which (1) are of limited computational complexity to allow for fast processing, (2) feature a detection range able to cover all practical frequency offsets, (3) maintain a given accuracy even at the lower edge of the operating SNR region, and (4), if based on a training sequence, then the same sequence has to be bandwidth-efficient and with a low Peak-to-Average Power Ratio (PAPR).

SUMMARY

The present invention, accordingly, provides a carrier frequency offset estimation and correction algorithm, based on the phase of the auto-correlation of the received signal in a MIMO system, after proper signal processing. The algorithm is based on the adoption of a training sequence wherein different transmit (TX) antennas are divided into groups. The TX antenna groupings are made in such a way that antenna correlation for every group is minimized (i.e., antennas belonging to the same group are chosen so that transmit signals from different antennas have a minimal amount of spatial correlation). Each group performs transmission on a specific frequency band and with a time periodicity different from other groups. Sequences transmitted by every antenna in a given group are reciprocally time-orthogonal to guarantee uniform synchronization performance, even in low channel rank condition.

At each receive (RX) antenna, the signal due to different transmission groups may be separated via fast Fourier transform (FFT) processing or other type of band-pass filtering. The group with the shortest time period determines the maximum estimation range of a frequency offset estimation algorithm. Conversely, the group with longest time period determines the accuracy of the algorithm.

As discussed below, for systems having four or more TX antennas, the training sequence of the invention guarantees high synchronization reliability, while the algorithm has clearly better accuracy than is provided by conventional technology.

The algorithm of the present invention is also applicable to the case of two and three TX antennas and for SISO systems. For a SISO system, the group of antennas is configured from a single element.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
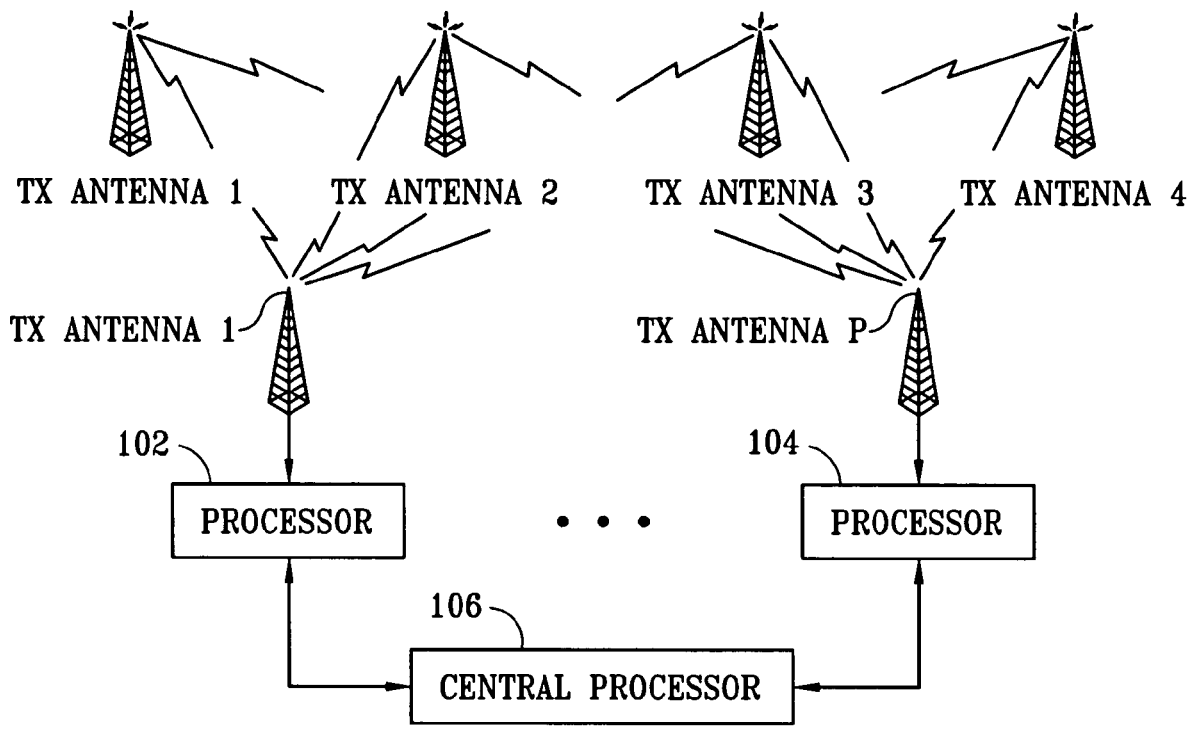
FIG. 1 exemplifies a system that embodies features of the present invention.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning wireless transmission, MIMO and SISO broadband multi-carrier transmission links, frequency offsets, training sequences, and the like, have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

The invention can operate in all multi-carrier systems having one or more TX antennas. However, the case of four TX antennas is well-suited to the invention and, as such is described in particular detail herein. It is understood, though, that the algorithm described herein is applicable to all types of MIMO, MISO and SIMO systems.

The simulations exemplified herein utilize an MC-MIMO system, and hence the notation used in the following refers to a system with N subcarriers, M TX antennas, and P RX antennas. In particular, the system of the invention can provide benefits in future cellular communication systems that are likely to be based on MC-CDMA or OFDM modulation.

Accordingly, let the OFDM signal at the m-th TX antenna be:

$$x_m(t) = \frac{1}{N}\sum_{n=0}^{N-1} X_m(n) e^{j2\pi nt/N}, \quad m = 1 \ldots M \quad (1)$$

Then let the received signal at the p-th RX antenna be:

$$r_p(t) = \sum_{m=1}^{M}\sum_{l=1}^{\Delta-1} c_l^{mp}(t) x_m(t-l) + v_p(t), \quad p = 1 \ldots P \quad (2)$$

where $\Delta$ represents the maximum delay spread of the channel (i.e., the time unit is the sampling time), $c_l^{mp}$ is the l-th tap of the mp MIMO subchannel, and the first tap is placed in the time origin. $v_p$ is an additive noise contribution.

The M TX antennas are divided in $\beta$ different groups $\Gamma_l$, l=1 ... $\beta$. If $\Gamma_m$ is the group containing the m-th TX antenna, let $R_m$ be the number of its elements. Moreover, to each group a set of subcarriers $\Omega_m$ is assigned.

Antenna assignment to groups has to be carried out such that the reciprocal correlation between antennas in the same group is minimized. If, by way of example, M=4 and $\beta$=2, then antennas {1, 3} should be assigned to the first group and {2, 4} to the second group. Choosing different groups, such as {1, 2}, brings a drop of performance especially for highly-correlated channels and/or a small number of RX antennas.

If the total length of the sequence is given by an integer number S of OFDM symbols without CP, then, during the transmission interval of the training sequence, the following time-domain signal is transmitted from the m-th TX antenna:

$$\tilde{x}_m(t) = \sum_{k=0}^{S\xi_m - 1} C_m^{D_m}(t - kD_m), \quad t = 0 \ldots S \cdot N - 1 \quad (3)$$

where $D_m = N/\xi_m$ represents the time period of the training sequence relative to the group $\Gamma_m$. This corresponds, in the frequency domain, to use one subcarrier every $\xi_m$ subcarriers in the set $\Omega_m$, while the remaining subcarriers are set to zero. $C_m^{D_m}$ is a pseudo-random sequence of length $D_m$.

It should be noted that a significant difference between the invention and the prior art is that the former assigns a different time period to signals transmitted from different TX antennas.

The various $C_m^{D_m}$ are chosen so that a pseudo-orthogonality condition between different TX antennas is achieved:

$$\forall m', m'' \in \{1 \ldots M\}, \quad (4)$$

$$\sum_{t=0}^{SN-1} \tilde{x}_{m'}(t) \cdot \tilde{x}_{m''}^*(t+k) = \begin{cases} \alpha_m & \text{if } m' = m'' = m \text{ AND } k = 0 \\ \approx 0 & \text{otherwise} \end{cases}$$

The pseudo-orthogonality condition is broader than the orthogonality condition and, as such, is inclusive of cases in which the random sequences used to build the training sequence are orthogonal codes, such as Walsh-Hadamard codes.

In the practical design of the training sequence, S will typically be on the order of 1 or 2. $C_m^{D_m}$ can be produced in the time domain and then filtered to eliminate subcarriers not belonging to $\Omega_m$. In the simulations exemplified herein, the signal has been produced in the frequency domain, and then transformed to the time domain via IFFT, as discussed in further detail below. The training sequence proposed here is also compatible with the packet detection technique proposed in co-pending patent application entitled "Robust Packet Detection System and Training Sequence for SISO and MIMO Broadband Multicarrier Transmission" Ser. No. PCT/US03/41506, filed Dec. 29, 2003, and the group with longest time period can be used for time synchronization.

The training symbols defined above in equation (3) may conveniently be utilized for a multi-step frequency offset estimation process as discussed in the following. For example, if $\beta=2$, then the offset estimation is performed in two steps.

As a preliminary step, let $D_1 < D_2$, such that $\Gamma_1$ is the group of TX antennas performing transmission with the shortest time period. The received signal relative to $\Gamma_1$ will be processed first and then be followed by $\Gamma_2$. The signal in equation (2) is filtered so that $r_p^{\Omega_l}(t)$ contains only the subcarriers belonging to the set $\Omega_l$.

The first offset estimation step (coarse estimation) is based on the following auto-correlation:

$$\Psi_p(k) = \left| \sum_{t=0}^{LN} r_p^{\Omega_l}(t) r_p^{\Omega_l *}(t+kD_l) \right|, \quad L \leq S \quad (5)$$

In the case considered here with $\beta=2$, it is assumed in equation (5) that l=1.

If $f_s$ is the sampling frequency, the coarse estimated frequency offset on the p-th RX antenna is given by:

$$f_{coarse,p} = -f_s \frac{L \sum_{k=1}^{k_{max}} (\Psi_p(k) e^{-L \Psi_p(k)/k})}{2\pi D_l} \quad (6)$$

The coarse estimate has a detection range of $\xi/(2k_{max})$ inter-carrier spacings.

In the hypothesis that all RX antennas are subject to the same frequency offset (that applies in case a single local oscillator is used), the frequency offset estimation can be averaged:

$$f_{coarse} = \frac{1}{P} \sum_{p=1}^{P} f_{coarse,p} \quad (7)$$

A coarse frequency adjustment is then applied to the received signal for every RX antenna:

$$r\hat{r}_p(t) = r_p(t) \cdot e^{-2\pi f_{coarse} t}, \quad p=1 \ldots P \quad (8)$$

Further offset estimation steps are based again on equation (5), performed on a different group $\Omega_l$, where the time period is longer than in the previous step. For the case of $\beta=2$, the second offset estimation step is also the final one (fine estimation). This step is performed with l=2:

$$\hat{\Psi}_p(k) = \left| \sum_{t=0}^{LN} \hat{r}_p^{\Omega_l}(t) \hat{r}_p^{\Omega_l *}(t+kD_l) \right|, \quad L \leq S \quad (9)$$

Based on equations (6) and (7) it is, as such, possible to compute a fine offset estimate:

$$f_{fine} = \frac{1}{P} \sum_{p=1}^{P} f_{fine,p} \quad (10)$$

Finally, the fine correction is applied to the received signal for every RX antenna:

$$\check{r}_p(t) = \hat{r}_p(t) \cdot e^{-2\pi f_{fine} t}, \quad p=1 \ldots P \quad (11)$$

It is noted that the overall above estimation process corresponds to an estimated frequency offset of:

$$\Delta f_{est} = f_{coarse} + f_{fine} \quad (12)$$

The invention may be generalized to any number of TX antennas. For example, for a case of three TX antennas, there are at least two possible implementations, as discussed further below. For a case of SISO and two TX antennas, the invention may be implemented using a single group (i.e., $\beta=1$) with respectively one or two elements. Such a group $\Gamma_l$ may not use a single set of subcarriers, but preferably two sets which may be designated as $\Omega_1$ and $\Omega_2$.

The definition from equation (3) of the training sequence is modified as follows:

$$\tilde{x}_m(t) = \sum_{k=0}^{S\xi_{m,1}-1} C_m^{D_{m,1}}(t - kD_{m,1}) + \sum_{k=0}^{S\xi_{m,2}-1} C_m^{D_{m,2}}(t - kD_{m,2}), \quad (13)$$

$$t = 0 \ldots S \cdot N - 1$$

where $C_m^{D_{m,1}}$ is a sequence with time period $$D_{m,1} = \frac{N}{\xi_{m,1}},$$

using the subcarriers in $\Omega_1$, and $C_m^{D_{m,2}}$ is a sequence with time period $$D_{m,2} = \frac{N}{\xi_{m,2}},$$

using the subcarriers in $\Omega_2$.

Thus, the signal transmitted from every TX antenna is the sum of two signals with different periods and different spectral bands. By adopting this kind of training sequence, it is possible to process the algorithm of the invention embodied in equations (5) through (12) without any modification.

Referring to FIG. 1 of the drawings, the reference numeral 100 generally designates a system embodying one preferred implementation of the present invention, which is directed to use in next-generation broadband multi-carrier systems, such as beyond-3G cellular systems and next-generation wireless local area networks (W-LANs). Accordingly, the system includes four transmit (TX) antennas TX 1, TX 2, TX 3, and TX 4, though the system may be adapted for 2 or 3 TX antennas, or more than 4 TX antennas, as discussed further below. Each of the transmit antennas TX 1, TX 2, TX 3, and TX 4 is configured for transmitting a signal wirelessly to each of a number P of receive (RX) antennas, exemplified as RX antennas 1 through P. Each RX antenna 1 and P is provided with a processor, such as a processor designated by the reference numerals 102 and 124, respectively, each of which processors is effective for executing the logic discussed below with respect to FIG. 4.

A simulation environment for a system such as the system 100 features a wide bandwidth (BW) of 100 MHz, subdivided into 2048 subcarriers (of which 1664 active and 384 fixed to zero value for compliance to a spectral mask with lateral guard bands and no signal in the central position). The channel model is a METRA (see: MIMO Channel Characterisation, METRA Project Deliverable D2 AAU-WP2-D2-V1.1, December 2000, available at http://www.ist-metra.org. IST 1999-11729 METRA project, IST-2000-30148 I METRA Project) channel with re-sampled ITU Pedestrian-A delay profile. The mobile speed is 3 km/h. Noise is injected at the receiver as Additive White Gaussian Noise (AWGN).

The suggested implementation covers specifically the case of a MIMO system having four TX antennas, and P RX antennas, where there are no constraints on P. In the following, some practical training sequences are suggested also for the case where there are two or three TX antennas, or more than four TX antennas.

Figure 2:
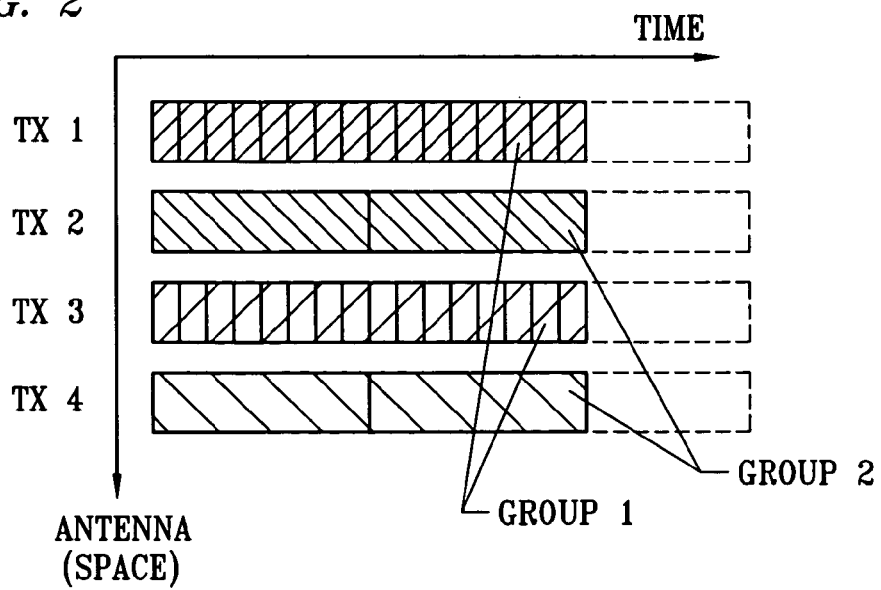
FIG. 2 exemplifies periodicity for two antenna groups, wherein a first antenna transmits with period N/16, and a second antenna transmits with a period N/2, and then the pattern is repeated, and wherein different sequences are all reciprocally orthogonal in the time domain, and after the training symbols, other sequences can follow such as symbol timing recovery and channel estimation.

Simulations have been run with M=P=4, β=2, L=S=1, $\xi_1$=16, $\xi_2$=2, $k_{max}$=2 for the case l=1, and $k_{max}$=1 for the case l=2. The adopted training sequence is shown in FIG. 2, wherein a first antenna transmits with a period of N/16, and a second antenna transmits with period of N/2, and then the pattern is repeated. Different cross-hatchings show that the different sequences are all reciprocally orthogonal in the time domain. Dashed lines show that after these training symbols, other sequences can follow, such as, for example, symbol timing recovery and channel estimation.

Filtering has been effectuated by FFT. Ad-hoc filters may be used to further improve performance by a fraction of dB.

The foregoing parameters substantially guarantee a maximum estimation range of ±4 inter-carrier spacings. This is a design specification in the case that in both TX and RX oscillators with long-term stability of 20 ppm are used and the carrier frequency is in the 5 GHz band.

It is understood that a number of different sets of parameters may be used, such as, by way of example, M=P=4, β=2, L=S=1, $\xi_1$=8, $\xi_2$=2, $k_{max}$=1 for the case l=1, and also $k_{max}$=1 for the case l=2. While this set of parameters is not simulated herein, it has been adopted in the training symbols of FIG. 10, discussed below.

Figure 3:
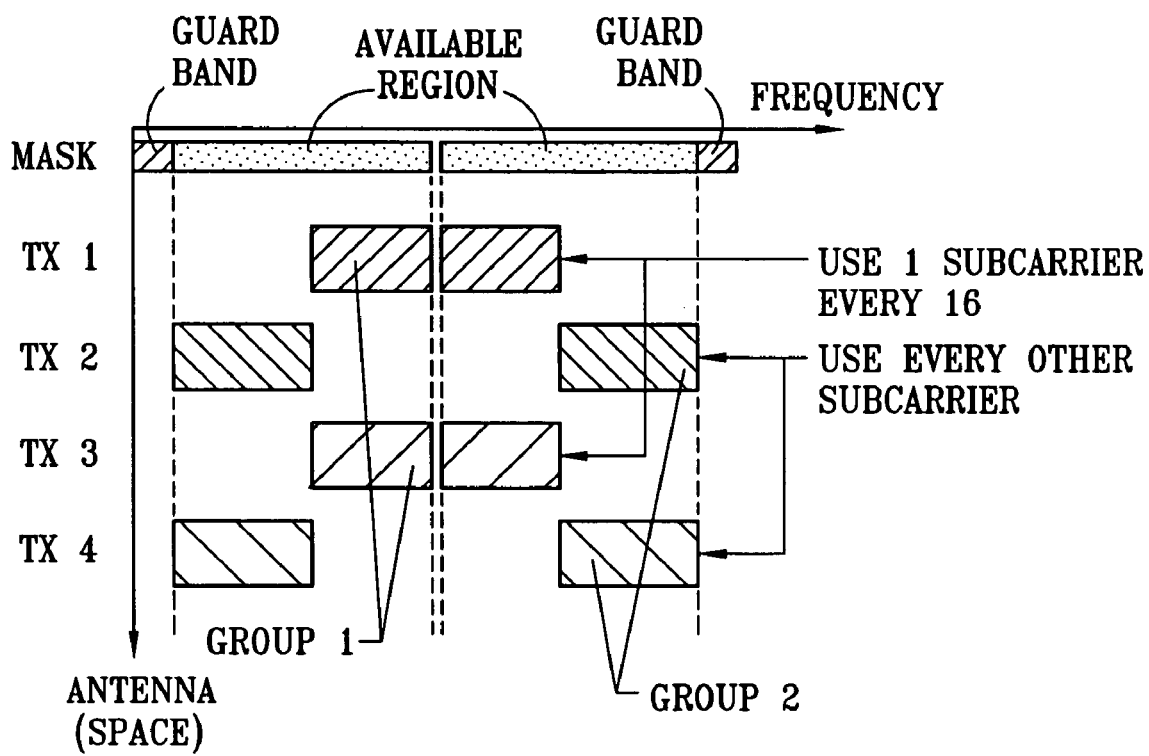
FIG. 3 exemplifies spectral mapping of signals in the training sequence, wherein a signal is set to a zero level in the guard bands and in the central position (because of base-band processing needs)

The spectral representation of the training sequence shown in FIG. 2 is mapped in FIG. 3. The signal is set to a zero level in the guard bands and in the central position, due to base-band processing needs.

Figure 4:
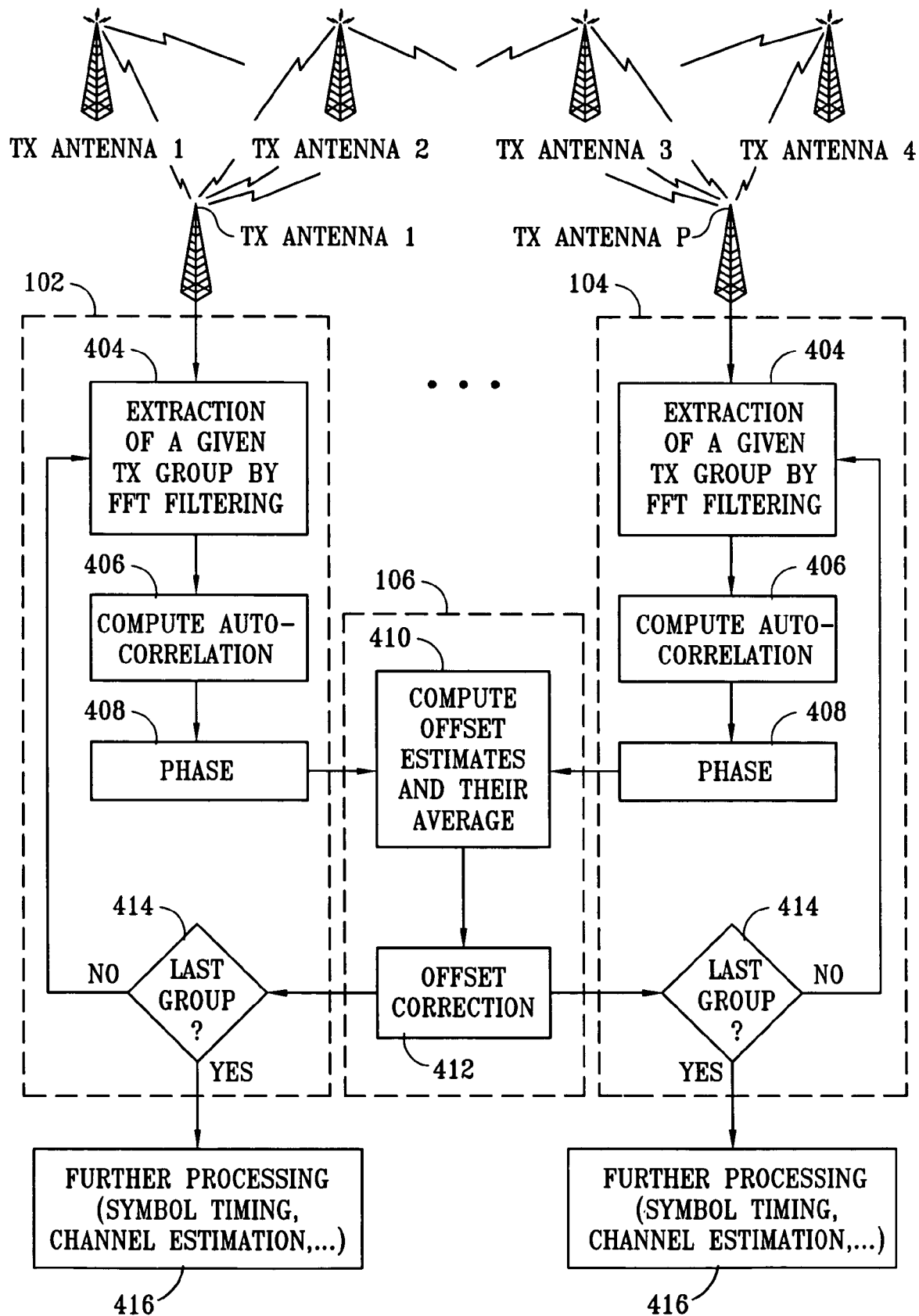
FIG. 4 is a block-diagram representation of the offset estimation algorithm, it being understood that, while not explicitly shown in FIG. 4, a similar processing block to the one used for RX antenna 1 is necessary for each RX antenna.

The implementation of the offset estimation algorithm (e.g., equations 5-12) is shown in the block diagram of FIG. 4. With respect to each RX processors 102 and 104, in step 404, the signals from each group are separated via FFT processing. In step 406, the autocorrelation (equations 5 and 9) of each signal is computed, and in step 408, the phase (as used in equation 6) of each signal is computed and transmitted to the central processor 106. In step 410, the central processor 106 receives the autocorrelation and phase from each receiver and computes a frequency offset estimate for each receiver, and an average offset estimate across all receivers, using equation 7 (in the first cycle) or equation 10 (in the second cycle). In step 412, the frequency offset correction is calculated from the average frequency offset estimation calculated in step 410, using equation 8 in the first cycle, and equation 11 in the second cycle, and is applied to the signal received from each respective antenna. In step 414, a determination is made whether every group of transmitted signals has been analyzed and, if not, then execution returns to step 404 wherein extraction of a next TX group is performed by FFT filtering using the offset correction last calculated in step 412; otherwise, execution proceeds to step 416, in which further processing, such as symbol timing, channel estimation, and the like, are performed using the offset-corrected receive signal calculated in step 412, and the resulting signal is then processed and used in a conventional manner which is considered to be well-known in that art and will, therefore, not be described in further detail herein.

In accordance with the foregoing, it will be apparent to one skilled in the art that, in the example shown with β=2, the algorithm would be performed by the receivers 1 through P and the central processor 106 in the order of steps 404, 406, 408, 410, 412, 414, 404, 406, 408, 410, 412, 414, and 416.

Concerning the implementation of the algorithm, it should be noted that, after the signal belonging to different groups has been separated with a filter, it is also possible to compute the auto-correlation in the frequency domain, as shown in P. Moose, *A technique for orthogonal frequency division multiplexing frequency offset correction*, IEEE Trans. Commun., vol. 42, pp. 2908-2914, October 1994.

The performance of this algorithm may be compared to a traditional implementation transmitting signals having the same time period from every TX antenna. To perform a fair comparison, the traditional implementation has been designed with the same detection range of the proposed approach.

Figure 5:
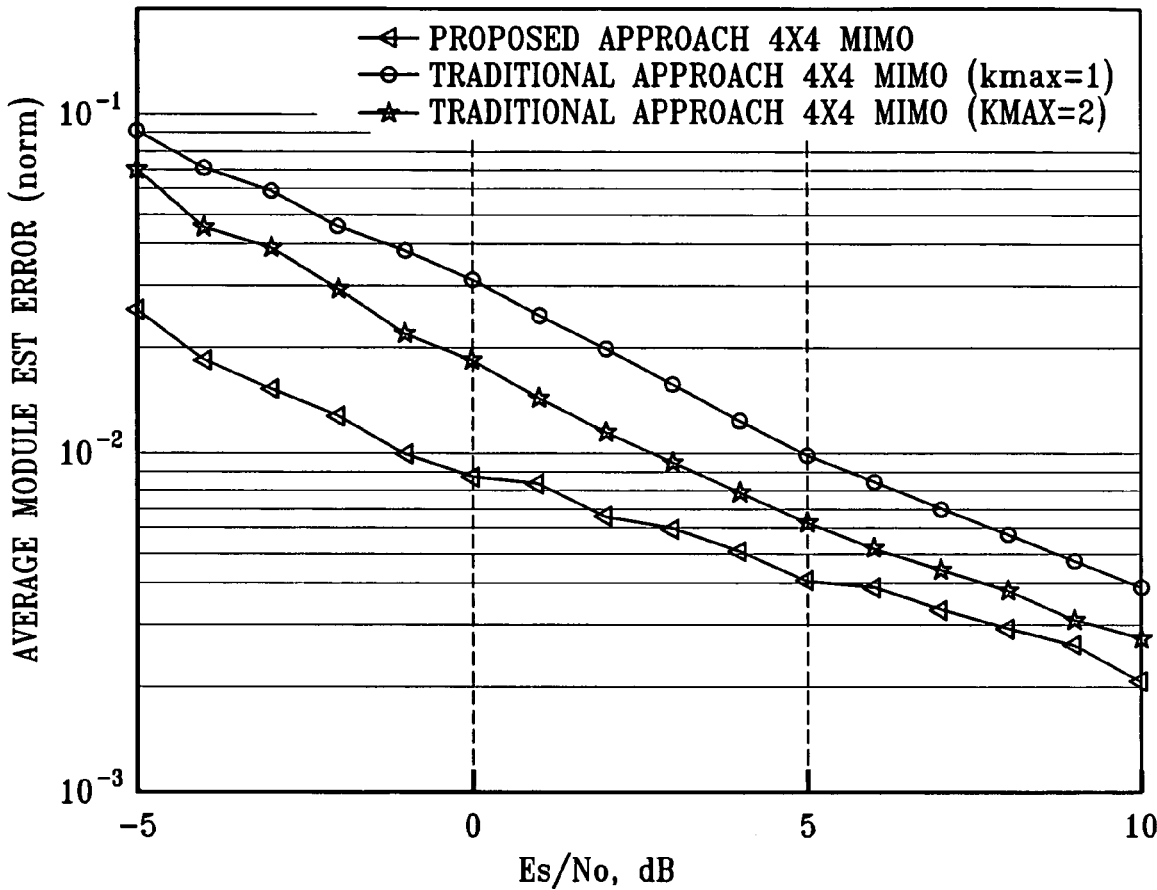
FIG. 5 depicts the performance of the invention against the conventional approach, exemplified for two cases of single and double correlation window, it being understood that for high SNR, the performance gain in the simulations is limited by a noise floor due to non-ideal filtering with FFT.

The simulation results for both the traditional method and the method embodied by the invention are shown in FIG. 5. Performance of the proposed approach and the traditional approach (for the two cases of single and double correlation window). For a high SNR the performance gain in the simulations is limited by a noise floor due to non-ideal filtering with FFT.

From FIG. 5, it can be seen that the proposed approach has a performance advantage on the order of 5 to 6 dB in comparison to the traditional approach based on auto-correlation. The traditional approach can be made more accurate by using two correlation windows instead of one and summing the average phase of the correlation after proper normalization; however, even in such a case, the performance advantage of the approach embodied by the invention is still on the order of 3 dB.

Figure 6:
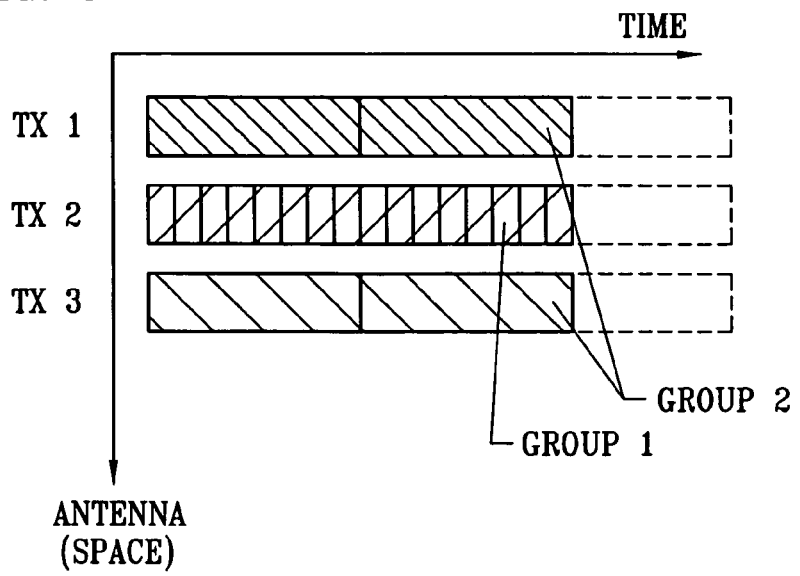
FIG. 6 exemplifies a training sequence for a case of three TX antennas, wherein a first group comprises one antenna, and a second group comprises two antennas with low mutual correlation, and are time-wise orthogonal.

FIG. 6 exemplifies a preferred training sequence suitable for implementation of the invention using three TX antennas. The first group is formed by just one antenna (TX 2), and the second group contains two antennas (TX 1 and TX 3) with low mutual correlation. Different cross-hatchings indicate temporal orthogonality.

Provided that the coarse estimation with the first group (TX 2) is able to give an estimate with error below the half inter-carrier spacing, the type of training sequence shown in FIG. 6 has a final estimation precision equivalent to the case of four TX antennas. The total algorithm performance is slightly worse than the four TX antenna case because in some cases the fading condition on the signal transmitted from TX 2 will be too severe to permit a correct coarse synchronization.

Figure 7:
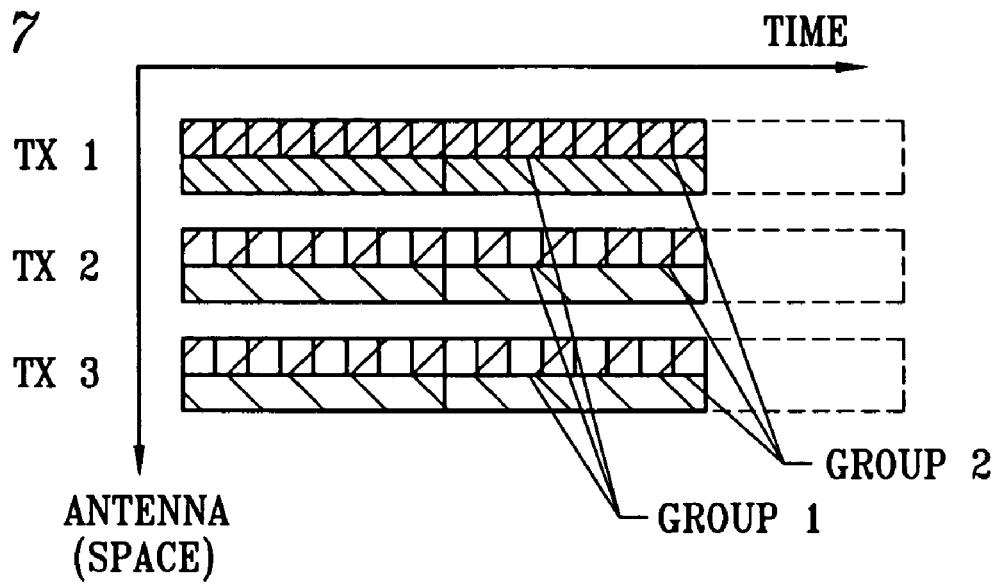
FIG. 7 exemplifies a training sequence for a case of three TX antennas, wherein every antenna transmits a combination of long-time period and short-time period training symbols, and are time-wise orthogonal.

Taking into account this possibility (i.e., that the fading condition on the signal transmitted from TX 2 of FIG. 6 will be too severe to permit a correct coarse synchronization), an alternative preferred training sequence depicted in FIG. 7 may be used. Every antenna (i.e., TX 1, TX 2, and TX 3) transmits a combination of long-time period and short-time period training symbols. As discussed above, different cross-hatchings indicate temporal orthogonality.

The training sequence detailed in FIG. 7 guarantees a better degree of spatial diversity protection in a deep fading condition. In this case, the training symbols are expressed not according to equation (3), but according to equation (13).

Figure 8:
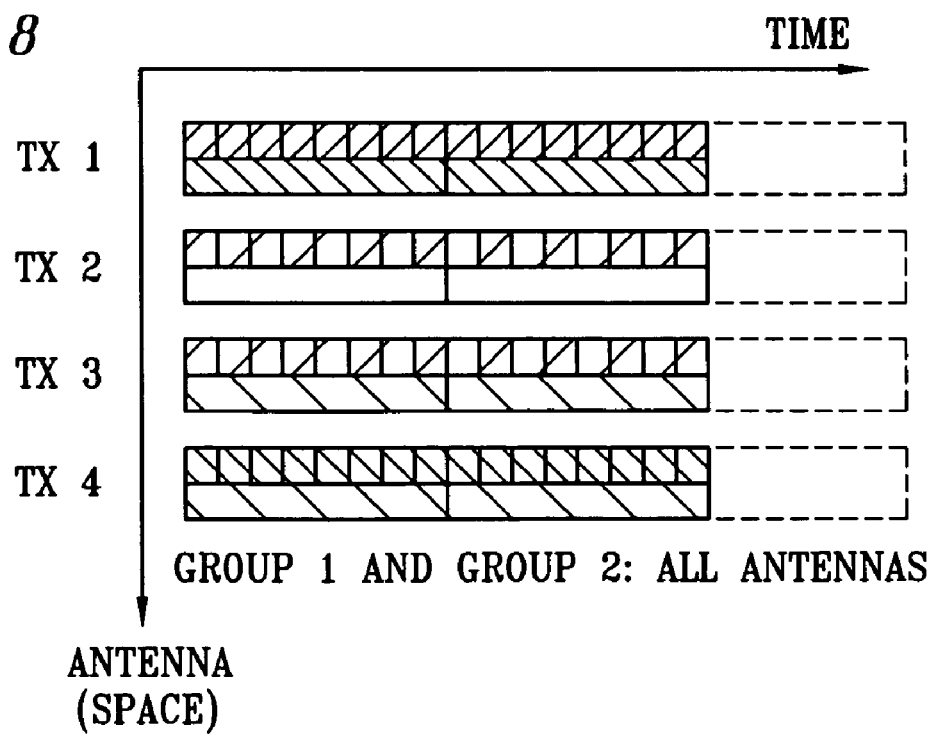
FIG. 8 exemplifies alternative training sequence for a case of four TX antennas, wherein every TX antenna transmits a sum of short time period and long time period training symbols.

Similarly, as depicted in FIG. 8, alternative training sequences may be used in the case of four TX antennas, wherein every TX antenna transmits a sum of short-time period and long-time period training symbols.

Figure 9:
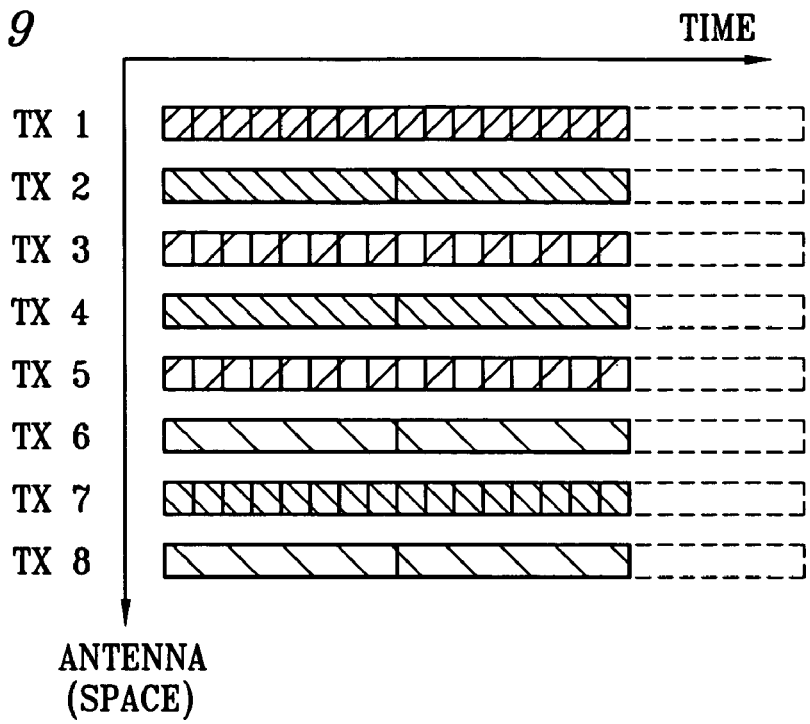
FIG. 9 exemplifies a training sequence for system with eight TX antennas, having a group 1 formed by antennas {1, 3, 5, 7}, while a group 2 is formed by antennas {2, 4, 6, 8}.

FIG. 9 gives a proposal of a training sequence for the case of eight TX antennas, showing a training sequence for a system with eight TX antennas. Group 1 is formed by antennas $\{1, 3, 5, 7\}$, while group 2 is formed by $\{2, 4, 6, 8\}$. The method of implementation utilized in FIG. 8 may also be used in the case of eight or more TX antennas, wherein all groups include all TX antennas. Combinations of the foregoing are also possible, such as, for example, the transmission of signals with one time period on a given set of antennas and superposition of signals with different periods on other antennas.

Figure 10:
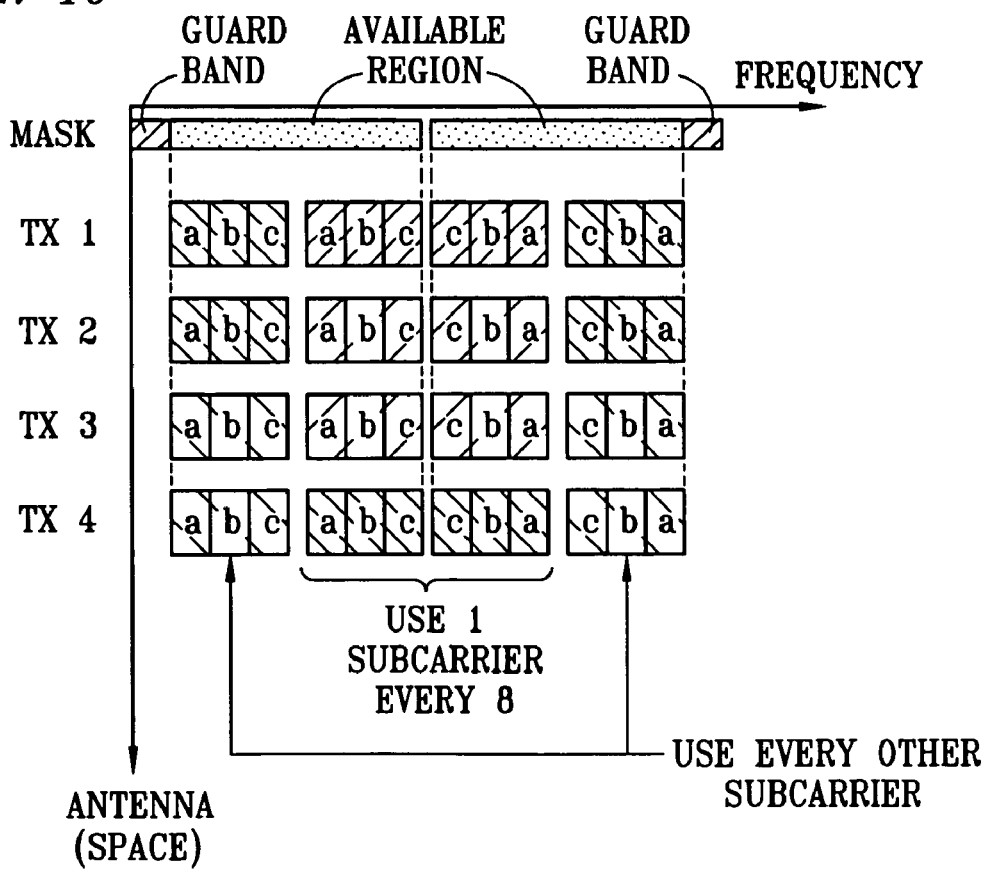
FIG. 10 presents a spectral representation for the sequence shown in FIG. 8.

The present invention can also be conveniently applied in the case of cellular systems with heavy co-channel interference. In such cases, the total available BW is divided so that directly interfering base stations use different frequency bands for the transmission of their respective training sequences. FIG. 10 depicts a spectral representation for the first part of the sequence shown in FIG. 3. The letters A, B, C indicate frequency packets transmitted by the up to three interfering BTS. With proper network planning, direct co-channel interference is avoided because of frequency multiplexing. This principle can be immediately extended to the case of four directly interfering BTS.

By the use of the present invention, for a given training sequence, the offset estimation accuracy is directly proportional to three factors, namely, (1) the total number of samples in the correlation window, (2) the SNIR at the receiver, and (3) the time period of the training sequence.

If a practical example is considered, where M=4, $\beta$=2, $\xi_1$=16, $\xi_2$=2, it is apparent that compared to the prior art, the received SNIR decreases by 3 dB (two times), but the period is increased by eight times, meaning that the average error in the estimation will be roughly four times smaller with the proposed approach.

In formulas, the variance of frequency offset estimators for high SNR in both time domain and frequency domain is given by:

$$\sigma = \frac{1}{\pi^2 N \cdot SNIR} \quad (14)$$

for the case of a correlation window of length N samples.

In the above case the proposed approach reduces the ratio of the estimate variance to the estimate average by 6 dB. In the simulations, a performance advantage may be slightly below 6 dB because of non-ideal filtering in the process of deriving $r_p^{\Omega_i}(t)$.

The proposed approach, including training sequence and algorithm, improves considerably the estimation accuracy of the carrier frequency offset. The advantage in performance is several dBs over prior art methods, as shown in FIG. 5.

A further advantage of the invention is that space diversity is utilized to reduce the total time length of the training sequence for frequency offset estimation, for a given detection range and estimation accuracy. This in turn improves the spectrum utilization of the packet. The invention is also well-suited for implementation in the presence of a packet detection system that operates with large time variance for low SNIR scenarios. This is a further advantage over possible implementations where different types of short training symbols are inserted consecutively in the training sequence. The proposed training sequence may also be exploited for MIMO symbol timing recovery (the group with the longest time period), and this could result in further optimization of the spectrum usage.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for facilitating broadband multi-carrier wireless transmission, the method comprising:

dividing a plurality of transmit antennas into two or more transmit antenna groups so that the correlation between antennas in each group is minimized, and each group of antennas transmits on a predetermined frequency with a different time periodicity, and each transmit antenna in each group transmits training sequences which are reciprocally time-orthogonal;

receiving by each of a plurality of receive antennas signals from each transmit antenna group;

separating the signal from each transmit antenna group via a band-pass filter;

determining a maximum estimation range of a frequency offset estimation algorithm by the group having the shortest time period;

determining the accuracy of the frequency offset estimation algorithm by the group having the longest time period; and correcting said received signal with a frequency offset estimation.

2. The method of claim 1 wherein said band-pass filter is an FFT filter.

3. The method of claim 1 wherein the received signal is received in a MIMO system.

4. The method of claim 1 wherein the received signal is received in a SISO system.

5. The method of claim 1 wherein the frequency offset estimation algorithm comprises a formula for estimating frequency offset with reference to a training sequence given by:

$$\tilde{x}_m(t) = \sum_{k=0}^{S\xi_m - 1} C_m^{D_m}(t - kD_m), \quad t = 0 \ldots S \cdot N - 1.$$

6. The method of claim 1 wherein the frequency offset estimation algorithm comprises a formula for estimating frequency offset with reference to a training sequence given by:

$$\tilde{x}_m(t) = \sum_{k=0}^{S\xi_{m,1} - 1} C_m^{D_{m,1}}(t - kD_{m,1}) + \sum_{k=0}^{S\xi_{m,2} - 1} C_m^{D_{m,2}}(t - kD_{m,2}),$$

$$t = 0 \ldots S \cdot N - 1.$$

7. The method of claim 1 wherein the autocorrelation of the received signal is given by:

$$\Psi_p(k) = \left| \sum_{t=0}^{LN} r_p^{\Omega_l}(t) r_p^{\Omega_l^*}(t + kD_l) \right|, \quad L \leq S.$$

8. The method of claim 1 wherein the autocorrelation of the received signal is given by:

$$\Psi_p(k) = \left| \sum_{t=0}^{LN} r_p^{\Omega_l}(t) r_p^{\Omega_l^*}(t + kD_l) \right|, \quad L \leq S,$$

and a coarse estimated frequency offset on a p-th RX antenna is given by:

$$f_{coarse,p} = -f_s \frac{L \sum_{k=1}^{k_{max}} \left( \Psi_p(k) e^{-L\psi_p(k)/k} \right)}{2\pi D_l}.$$

9. A method for facilitating broadband multi-carrier wireless transmission, the method comprising:

dividing a plurality of transmit antennas into two or more transmit antenna groups so that the correlation between antennas in each group is minimized, and each group of antennas transmits on a predetermined frequency with a different time periodicity, and each transmit antenna in each group transmits training sequences which are reciprocally time-orthogonal;

receiving by each of a plurality of receive antennas signals from each transmit antenna group;

separating out the received signal from each transmit antenna group via a band-pass filter;

for each received signal separated out from each transmit antenna group, computing the autocorrelation and phase of each received signal, and, based on the autocorrelation and phase of each received signal, computing a frequency offset estimate of each received signal;

computing the average of said frequency offset estimates computed for each received signal; and correcting said received signal with said average of said frequency offset estimates.

10. The method of claim 9 wherein said band-pass filter is an FFT filter.

11. The method of claim 9 wherein the received signal is received in a MIMO system.

12. The method of claim 9 wherein the received signal is received in a SISO system.

13. The method of claim 9 wherein the step of computing frequency offset estimate of each received signal further comprises the step of estimating frequency offset of each received signal with reference to a training sequence given by:

$$\tilde{x}_m(t) = \sum_{k=0}^{S\xi_m - 1} C_m^{D_m}(t - kD_m), \quad t = 0 \ldots S \cdot N - 1.$$

14. The method of claim 9 wherein the frequency offset estimation algorithm comprises a formula for estimating frequency offset with reference to a training sequence given by:

$$\tilde{x}_m(t) = \sum_{k=0}^{S\xi_{m,1} - 1} C_m^{D_{m,1}}(t - kD_{m,1}) + \sum_{k=0}^{S\xi_{m,2} - 1} C_m^{D_{m,2}}(t - kD_{m,2}),$$

$$t = 0 \ldots S \cdot N - 1.$$

15. The method of claim 9 wherein the autocorrelation of the received signal is given substantially by:

$$\Psi_p(k) = \left| \sum_{t=0}^{LN} r_p^{\Omega_l}(t) r_p^{\Omega_l^*}(t + kD_l) \right|, \quad L \leq S.$$

16. The method of claim 9 wherein the autocorrelation of the received signal is given substantially by:

$$\Psi_p(k) = \left| \sum_{t=0}^{LN} r_p^{\Omega_l}(t) r_p^{\Omega_l^*}(t + kD_l) \right|, \quad L \leq S,$$

and a coarse estimated frequency offset on a p-th RX antenna is given substantially by:

$$f_{course,p} = -f_s \frac{L\sum_{k=1}^{k_{max}}(\Psi_p(k)e^{-\angle \Psi_p(k)/k})}{2\pi D_l}.$$

17. A system for facilitating broadband multi-carrier wireless transmission, the system comprising:
 a plurality of transmit antennas divided into two or more transmit antenna groups so that the correlation between antennas in each transmit antenna group is minimized, and each transmit antenna group transmits on a predetermined frequency with a different time periodicity, and each transmit antenna in each group transmits training sequences which are reciprocally time-orthogonal;
 a plurality of receive antennas configured for receiving a signal from each antenna group and separating the signal from each group via a band-pass filter, wherein a maximum estimation range of a frequency offset estimation algorithm is determined by the group having the shortest time period, and the accuracy of the frequency offset estimation algorithm is determined by the group having the longest time period; and
 a processor for executing said frequency offset estimation algorithm, and applying frequency offset to said received signal.

18. The system of claim 17 wherein said band-pass filter is an FFT filter.

19. The system of claim 17 wherein the frequency offset estimation algorithm comprises a formula for estimating frequency offset with reference to the maximum estimation range and the autocorrelation of the received signal in a MIMO system.

20. The system of claim 17 wherein the frequency offset estimation algorithm comprises a formula for estimating frequency offset with reference to the maximum estimation range and the autocorrelation of the received signal in a MIMO system, and a training sequence given by:

$$\tilde{x}_m(t) = \sum_{k=0}^{S\mathcal{E}_m-1} C_m^{D_m}(t-kD_m), \quad t = 0\ldots S\cdot N - 1.$$

21. The system of claim 17 wherein the frequency offset estimation algorithm comprises a formula for estimating frequency offset with reference to a training sequence given by:

$$\tilde{x}_m(t) = \sum_{k=0}^{S\mathcal{E}_{m,1}-1} C_m^{D_{m,1}}(t-kD_{m,1}) + \sum_{k=0}^{S\mathcal{E}_{m,2}-1} C_m^{D_{m,2}}(t-kD_{m,2}),$$

$$t = 0\ldots S\cdot N - 1.$$

22. The system of claim 17 wherein the frequency offset estimation algorithm comprises a formula for estimating frequency offset with reference to the maximum estimation range and the autocorrelation of the received signal in a MIMO system, and a training sequence given by:

$$\Psi_p(k) = \left|\sum_{t=0}^{LN} r_p^{\Omega_l}(t) r_p^{\Omega_l*}(t+kD_l)\right|, \quad L \le S.$$

23. The system of claim 17 wherein the frequency offset estimation algorithm comprises a formula for estimating frequency offset with reference to the maximum estimation range and the autocorrelation of the received signal in a MIMO system, a training sequence given by:

$$\Psi_p(k) = \left|\sum_{t=0}^{LN} r_p^{\Omega_l}(t) r_p^{\Omega_l*}(t+kD_l)\right|, \quad L \le S,$$

and a coarse estimated frequency offset on a p-th RX antenna is given by:

$$f_{course,p} = -f_s \frac{L\sum_{k=1}^{k_{max}}(\Psi_p(k)e^{-\angle \Psi_p(k)/k})}{2\pi D_l}.$$

* * * * *

UNITED STATES PATENT AND TRADEMARK OFFICE
CERTIFICATE OF CORRECTION

PATENT NO. : 7,298,787 B2
APPLICATION NO. : 10/877787
DATED : November 20, 2007
INVENTOR(S) : Paolo Priotti Page 1 of 1

It is certified that error appears in the above-identified patent and that said Letters Patent is hereby corrected as shown below:

In Column 11, Claim 8:
Please delete

" $$\Psi_p(k) = \left| \sum_{t=0}^{LN} r_p^{\Omega_t}(t) r_p^{\Omega_t}(t + kD_i) \right|, L \leq S,$$ "

And insert

-- $$\Psi_p(k) = \left| \sum_{t=0}^{LN} r_p^{\Omega_t}(t) r_p^{\Omega_t*}(t + kD_i) \right|, L \leq S,$$ --

In Column 13, Claim 16, in the second equation:
Please delete "course" and insert --coarse--

In Column 14, Claim 23, in the second equation:
Please delete "course" and insert --coarse--

Signed and Sealed this

Seventh Day of July, 2009

JOHN DOLL
*Acting Director of the United States Patent and Trademark Office*